United States Patent
Rehmann et al.

(10) Patent No.: US 7,463,168 B2
(45) Date of Patent: Dec. 9, 2008

(54) ENCODER

(75) Inventors: David A. Rehmann, Vancouver, WA (US); David K. Klaffenbach, Battle Ground, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/490,577

(22) Filed: Jul. 21, 2006

(65) Prior Publication Data

US 2008/0024330 A1 Jan. 31, 2008

(51) Int. Cl.
*H03M 1/22* (2006.01)
(52) U.S. Cl. .......................................... 341/11; 341/3
(58) Field of Classification Search .................. 341/3, 341/11, 15; 702/150; 700/56; 378/4, 205
See application file for complete search history.

(56) References Cited

U.S. PATENT DOCUMENTS

| | | | | |
|---|---|---|---|---|
| 4,914,437 A | * | 4/1990 | Kibrick et al. .................. | 341/3 |
| 5,109,397 A | * | 4/1992 | Gordon et al. ............... | 378/205 |
| 5,432,339 A | | 7/1995 | Gordon et al. | |
| 5,444,613 A | * | 8/1995 | Tani et al. ...................... | 700/56 |
| 5,932,874 A | * | 8/1999 | Legg et al. ............. | 250/231.13 |
| 6,038,523 A | * | 3/2000 | Akahane et al. ............. | 702/150 |
| 6,100,823 A | * | 8/2000 | Copper ........................ | 341/11 |
| 6,168,679 B1 | * | 1/2001 | Biagiotti ....................... | 156/64 |
| 6,259,084 B1 | * | 7/2001 | Kochis et al. ............. | 250/208.1 |
| 6,590,960 B2 | * | 7/2003 | Kroener et al. .............. | 378/162 |
| 6,718,003 B2 | * | 4/2004 | Sasaki ............................ | 378/4 |
| 7,126,107 B2 | * | 10/2006 | Ahne et al. ............ | 250/231.13 |
| 7,129,858 B2 | * | 10/2006 | Ferran et al. ................... | 341/11 |
| 7,278,786 B2 | * | 10/2007 | Fiedler et al. ............... | 378/205 |

OTHER PUBLICATIONS www.sxlist.com, Input Sensors for Position Change: Quadrature Encoders, Apr. 12, 2006.
Astronomical Observatory of Capodimonte—Technology Working Group, Encoder System Design: Strategies for Error Compensation, Via Moiariello 16, I-80131 Napoli, Italy, no date.

* cited by examiner

*Primary Examiner*—Peguy JeanPierre

(57) ABSTRACT

Various methods and apparatus relating to an encoder are disclosed.

17 Claims, 7 Drawing Sheets

ENCODER

BACKGROUND

Encoders may be used to detect positioning and/or motion of objects. Encoder system component manufacturing tolerances reduce the overall system accuracy.

DETAILED DESCRIPTION OF THE EXAMPLE EMBODIMENTS

Figure 1:
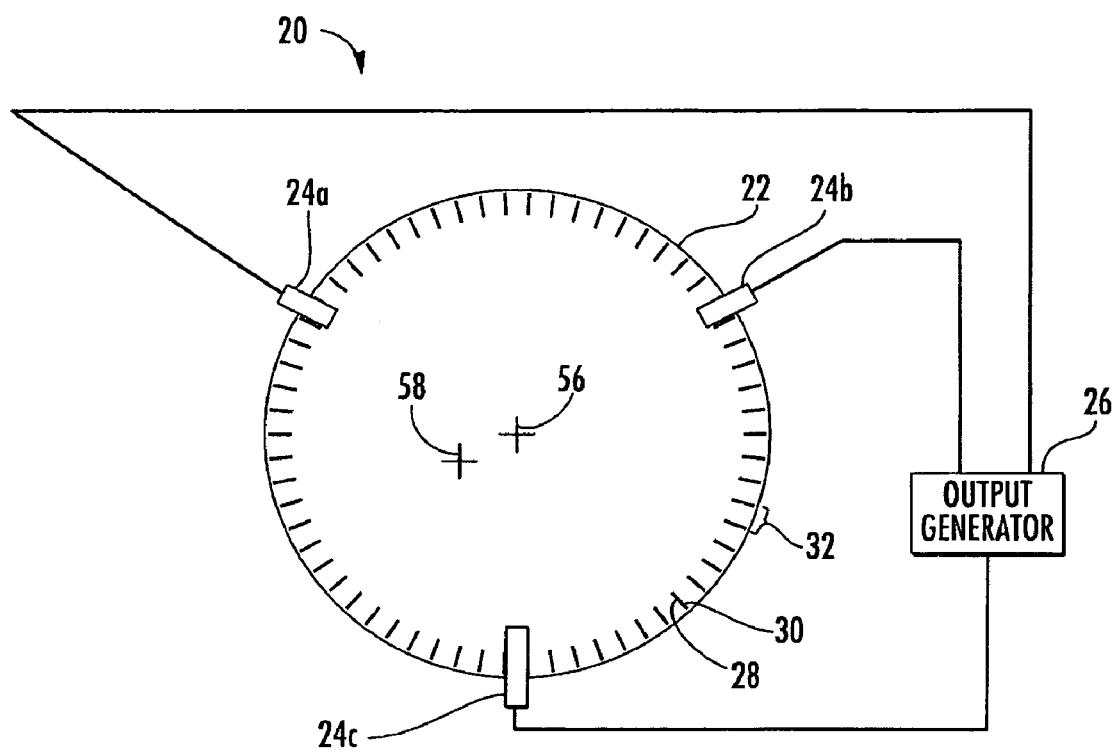
FIG. 1 is a schematic illustration of an encoder system according to an example embodiment.

FIG. 1 schematically illustrates one example of an encoder system 20. Encoder system 20 comprises a device configured to detect positioning or motion of one or more objects or structures associated with encoder system 20. System 20 generally includes encoder track 22, sensors 24A, 24B and 24C (collectively referred to as sensors 24) and output generator 26. Encoder track 22 comprises a series of notches, slits, markings or other structures or surface treatments (hereafter referred to as marks 28) having edges 30 equidistantly spaced from one another by predetermined increments and configured to be sensed by sensors 24. In the example illustrated, marks 28 comprise a multitude of slits or transparent lines configured to permit passage of light, wherein portions of track 22 between marks 28 interrupt the transmission of light. In other embodiments, track 22 may have other configurations.

Sensors 24 comprise one or more devices configured to sense movement of track 22. In particular, each sensor 24 is configured to generate a signal as an edge 30 and a particular sensor 24 move relative to one another. In the particular example illustrated, each of sensors 24 comprises an optical sensor having a light emitter element and a light sensing element on opposite sides of encoder track 22. As encoder track 22 is moved relative to sensors 24, light from the emitter element being received by sensing element is repeatedly interrupted by those portions of encoder track 22 between marks 28, wherein sensors 24 generate pulses or signals based upon such repeated interruptions. In one embodiment, sensors 24 may comprise quadrature encoders. In other embodiments, other encoder track sensing devices may be employed.

Output generator 26 comprises a device configured to receive the signals from each of sensors 24 and to determine a weighted centered of the times at which signals representing the passing of edges are received from sensors 24 by output generator 26 during movement of track 22 a distance of one track increment 32. Based upon the determined time weighted centered (TWC), output generator 26 generates an increment completion signal indicating that encoder track 22, and the object or structure associated with encoder track 22, has moved a distance equal to the predetermined distance of increment 32. According to one embodiment, output generator 26 includes at least one timer or counter which detects the elapsed time between receipt of edge signals from sensors 24 and one or more components such as processors, application specific integrated circuits (ASICs) and the like configured to determine the TWC of the elapsed times. As will be described in more detail hereafter, because output generator 26 generates an increment completion signal based at least in part upon a TWC, accuracy of encoder system 20 may be enhanced.

Figure 2:
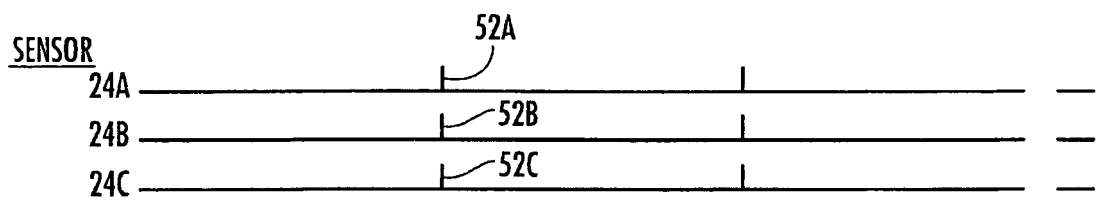
FIG. 2 is a graph illustrating a series of edge signals and a summation of edge signals provided by the encoder system of FIG. 1 according to an example embodiment.
Figure 3:
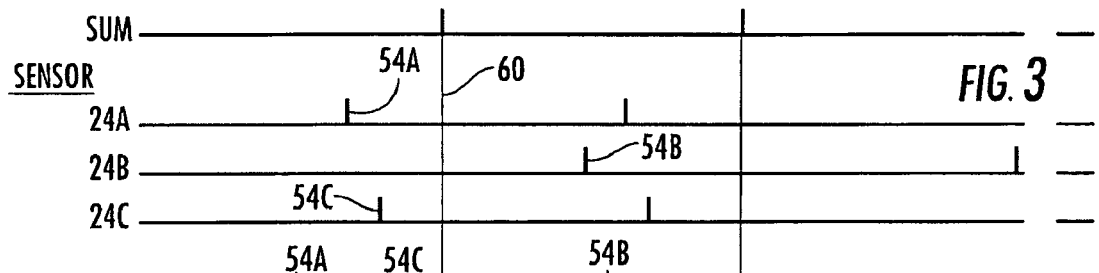
FIG. 3 is a graph illustrating another series of edge signals and a summation of edge signals provided by the encoder system of FIG. 1 according to an example embodiment.
Figure 4:
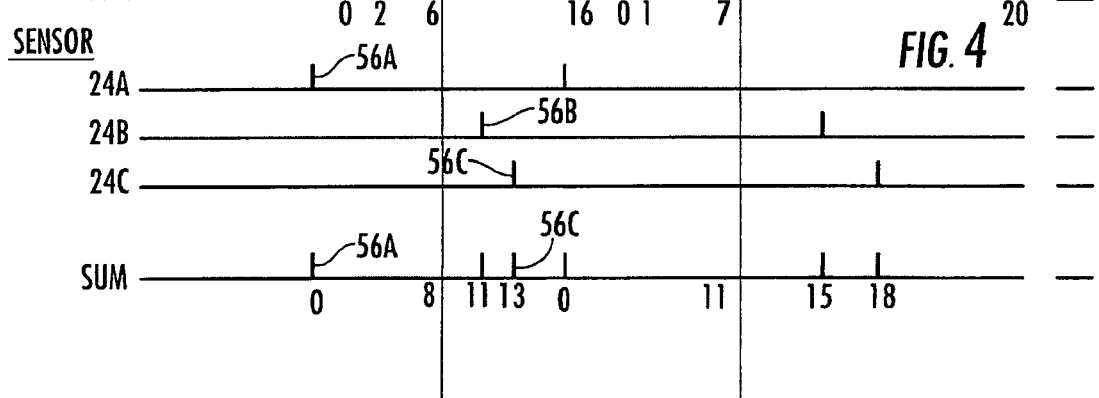
FIG. 4 is a graph illustrating another series of edge signals and a summation of edge signals provided by the encoder system of FIG. 1 according to an example embodiment.

FIGS. 2-4 illustrate how the use of a TWC by output generator 26 may increase accuracy of encoder system 20. FIGS. 2-4 illustrate example series of the signals received by output generator 26 from each of sensors 24 (shown in FIG. 1) during movement of encoder track 22 and the resulting sum of such signals as determined by output generator 26. Based on such signals, output generator 26 provides or outputs an increment completion signal. The timing in which output generator 26 provides the increment completion signal is partially based upon the time in which output generator 26 receives the Nth edge signal from N sensors. In the example illustrated in which encoder system 20 includes three sensors 24, output generator 26 outputs an increment completion signal partially based upon the time at which output generator 26 receives a third edge signal from sensors 24, collectively.

FIG. 2 illustrates an example in which encoder track 22 is perfectly connected or coupled to a rotatable object such that the rotational axis of encoder track 22, which is circular, is in exact alignment with the rotational axis of the rotatable object to which encoder track 22 is connected, and the N sensors 24 are equally spaced around the encoder track 22. As a result, during rotation of the rotatable object, leading edges 30 are simultaneously moved past each of sensors 24 (shown in FIG. 1). As shown FIG. 2, this results in sensors 24A, 24B, and 24C simultaneously outputting edge signals 52A, 52B and 52C, respectively each time the encoder track 22 has moved a distance equal to one increment 32. Because encoder track 22 is perfectly connected to the associated rotatable object and has no errors, output generator 26 receives the third and final edge signal from sensors 24 at the same time as the ideal time 60, the time at which movement of the rotatable object through a distance equal to increment 32 of encoder track 22 actually occurs.

Unfortunately, the shape of encoder track 22 may not always be perfect. Moreover, perfect alignment of encoder track 22 with respect to the rotational axis of the associated rotatable object is difficult to achieve. Such errors cause the time at which output generator 26 receives the final edge signal from sensors 24 to be different from the ideal time 60 or the time at which rotation of the object through one increment is completed. FIGS. 3 and 4 illustrate discrepancies caused by such errors. FIGS. 3 and 4 illustrate series of signals received by output generator 26 when encoder track 22 has errors or where the coupling of encoder track 22 to the rotatable object is not perfect. Examples of such errors include first order errors such as eccentricity and higher order errors such as ooziness and the like. In the embodiment shown in FIG. 1, encoder track 22, which is circular, is illustrated as having an eccentricity error. Encoder track 22 is not perfectly coupled to the rotatable object. As shown by FIG. 1, encoder track 22 has a marking center 56 (the point at which radial extensions of marks 28 converge) offset from or eccentric with respect to a rotational axis 58 of the rotatable object to which encoder track 22 is coupled. This error results in particular marks 28 on a first side of track 22 moving faster relative to sensors 24 and other marks 28 on an opposite side of track 22 moving slower relative to sensors 24. Consequently, as shown by FIGS. 3-4, output generator 26 (shown in FIG. 1) does not simultaneous receive signals from each of sensors 24 upon the completion of movement of encoder track 22 through a distance equal to one increment 32.

FIG. 3 illustrates signals received from sensors 24 when marking center 56 of encoder track 22 is more proximate to sensors 24A and 24C (and the rotational axis is more distant sensors 24a and 24c) and is more distant to sensor 24B. As a result, marks 28 more proximate to sensors 24A and 24C are moving faster while marks 28 more proximate to sensor 24B are moving slower. Thus, signals received from sensors 24A and 24C occur at a higher frequency (i.e. Shorter period) and the signals from sensor 24B occurs at a lower frequency (i.e. Longer period) as compared to the time at which such signals would be outputted from sensors 24 in the absence of an error (as shown in FIG. 2).

FIG. 4 illustrates signals received from sensors 24 when marking center 56 of encoder track 22 is more proximate to sensor 24A and is more distant to sensors 24B and 24C. As a result, marks 28 more proximate to sensor 24A are moving faster and marks more proximate to sensors 24B and 24C are moving slower. Thus, signals received from sensor 24A are received at a higher frequency and signals received from sensors 24B and 24C are received at a lower frequency as compared to an ideal time 60 at which such signals would be simultaneously received in the absence of any error as shown in FIG. 2.

If output generator 26 would generate the increment completion signal upon receiving a signal from the last of sensors 24, the third signal received collectively from sensors 24, the increment completion signal provided by output generator 26 would occur after the ideal time 60, the actual time at which movement of the rotatable object through the increment was completed, by a variable amount. This variable delay between the ideal time 60 and the receipt of the third and final signal from sensors 24 reduces the accuracy of movement detection. In particular, the receipt of the third and final edge signal from sensors 24 and the output of increment completion signal may be off from the ideal time (the actual completion of one increment of movement) by as much as (N−1)/N times the time it takes for the object to move one increment. In the example illustrated in FIG. 3, the third and final edge signal 54B is received by output generator 26 ten time units after actual completion of movement of the rotatable object through one increment 32. In the example illustrated in FIG. 4, the third and final edge signal 56C received by output generator 26 occurs five time units after actual completion of movement of the rotatable object through one increment 32. As shown by FIGS. 3 and 4, this discrepancy between the output of the increment completion signal by output generator 26 upon receiving the third and final edge signal from sensors 24 and the actual completion of the increment varies. As encoder track 22 and the associated rotatable object are rotated about axis 58, the proximity of marking center 56 to each of sensors 24 changes, causing the times at which signals output by sensors 24 relative to the ideal time 60 and relative to one another to also vary.

Output generator 26 addresses such errors of encoder track 22 or the mounting of encoder track 22 by outputting the increment completion signal using a weighted centered of the time at which the edge signals from sensors 24 are received. In particular, output generator 26, using one or more counters or timers, keeps track of elapsed time from the receipt of a first edge signal to the receipt of each subsequently received edge signal from sensors 24. Using one or more integrated circuit components or one or more processors, output generator 26 determines an average of such times and outputs the increment completion signal based upon the TWC. However, because the TWC calculation cannot be completed until after receipt of the final edge signal, which occurs after the ideal time 60, output generator 26 outputs the increment completion signal a predetermined constant time offset after the TWC. Because the increment completion signal is output at a constant time offset after the TWC (which is equal to the ideal time or the actual time at which the rotatable object has rotated a distance equal to one increment 32 of encoder track 22), this added constant time offset may be accounted for when subsequently using the increment completion signal to determine positioning or movement of the rotatable object to which encoder track 22 is coupled. According to one embodiment, the time constant is greater than twice the time it takes for the movable object to travel one increment and less than four times the same time.

The output generator 26 calculates a delay from the current time (time of receipt of the final signal 54C) to a time that equals the ideal TWC of the group of signals (which has already happened), plus a pre-selected constant. The output generator 26 does this by calculating the time of the ideal TWC relative to the current time and subtracting this delta from a pre-selected constant. In the example illustrated in FIG. 3, output generator 26 sums the elapsed time from the receipt of signal 54a to the receipt of the final signal 54C (2 time units) and the elapsed time from the receipt of signal 54a to the receipt of the final signal 54B (16 time units). Output generator 26 divides the resulting sum (18 time units) by the number of sensors 24 along track 22 (3) to arrive at the TWC (6 time units) which is equal to the amount of time after receipt of the first edge signal that an ideal output edge would have occurred. Output generator 26 then calculates a delay value from the current time (time the final signal 54B received) to a constant offset from the ideal output edge, by subtracting the ideal output edge to current time delta from the pre-selected constant. This calculated delay is the remainder of time to wait until a constant-delayed ideal TWC, or increment completion edge, should be generated. For example, if the predetermined time constant offset was chosen to be 20 time units, output generator 26 would output the increment completion signal 26 time units after receipt of the first edge signal 54A (ten time units after receipt of the final edge signal 54B).

Using the same method with respect to the example illustrated in FIG. 4, output generator 26 would determine the TWC to be 8 ((0+11+13)/3). Output generator 26 would output the increment completion signal 28 time units after receipt of the first edge signal 56A (15 times unit after receipt of the final edge signal 56C). Subsequent use of the output increment completion signal may take into account the added time constant offset of 20 time units. For example, the use of increment completion signals to determine when to fire fluid drops in a printing system could account for the added time constant of 20 units by also beginning the feeding of print media twenty time units later. Other adjustments could also be utilized.

Figure 5:
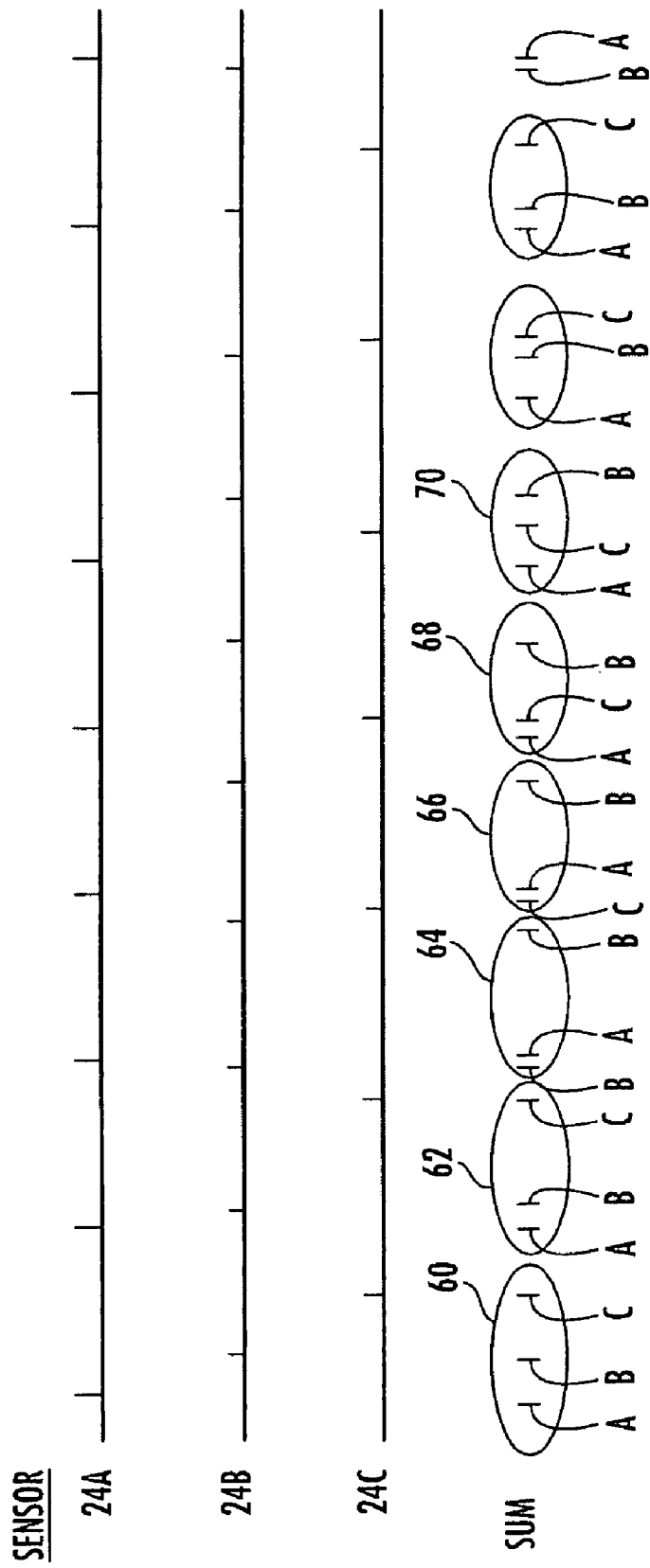
FIG. 5 is a graph illustrating another series of edge signals and a summation of edge signals provided by the encoder system of FIG. 1 according to an example embodiment.

As shown by FIG. 5, the TWC used to determine the time at which an output signal is produced by output generator 26 may be based upon signals from less than all of sensors 24. FIG. 5 illustrates signals received from sensors 24 over a longer period of time. In the example illustrated, encoder track 22 (shown in FIG. 1) has errors, such as eccentricity. These errors cause signals to be generated by sensors 24A, 24B and 24C at different frequencies (exaggerated for illustration). During the particular period of time shown in FIG. 5, sensor 24B is outputting signals at the greatest frequency and sensor 24C is outputting signals at the lowest frequency. As encoder track 22 rotates, the same errors may cause sensors 24A or 24B to have the greatest frequency and may cause sensors 24A and 24B to alternatively have the lowest frequency. As shown by the SUM line which collectively illustrates all of the signals, the different frequencies at which signals are produced may result in output generator 26 receiving signals from particular sensors more than other sensors. This may also result in more than one signal from a single sensor being used to calculate the TWC upon which the output of an output signal is based. For example, during the particular portion of time shown in FIG. 6, output signals are initially generated based upon TWC's calculated using signal group or clusters 60, 62 which utilize signals from each of sensors 24A, 24 B and 24C. The next four output signals produced by output generator 26 (shown in FIG. 1) are based upon the TWC's calculated using signal clusters 64, 66, 68 and 70. Signal cluster 64 utilizes a signal from sensor 24A and two signals from sensor 24B. Signal clusters 66, 68 and 70 include signals from each of sensors 24, but in different orders. Note that when the encoder track 22 error is not exaggerated for illustration, the signal frequencies of sensors 24A, 24B, and 24C are very close. Transitions of signal clusters are not as abrupt as illustrated in FIG. 5. But rather the transitions occur when signal edges from sensors 24A, 24B, and 24C are practically simultaneous. Therefore, the calculated output TWC is a smooth transition from one signal cluster to the next.

Figure 6:
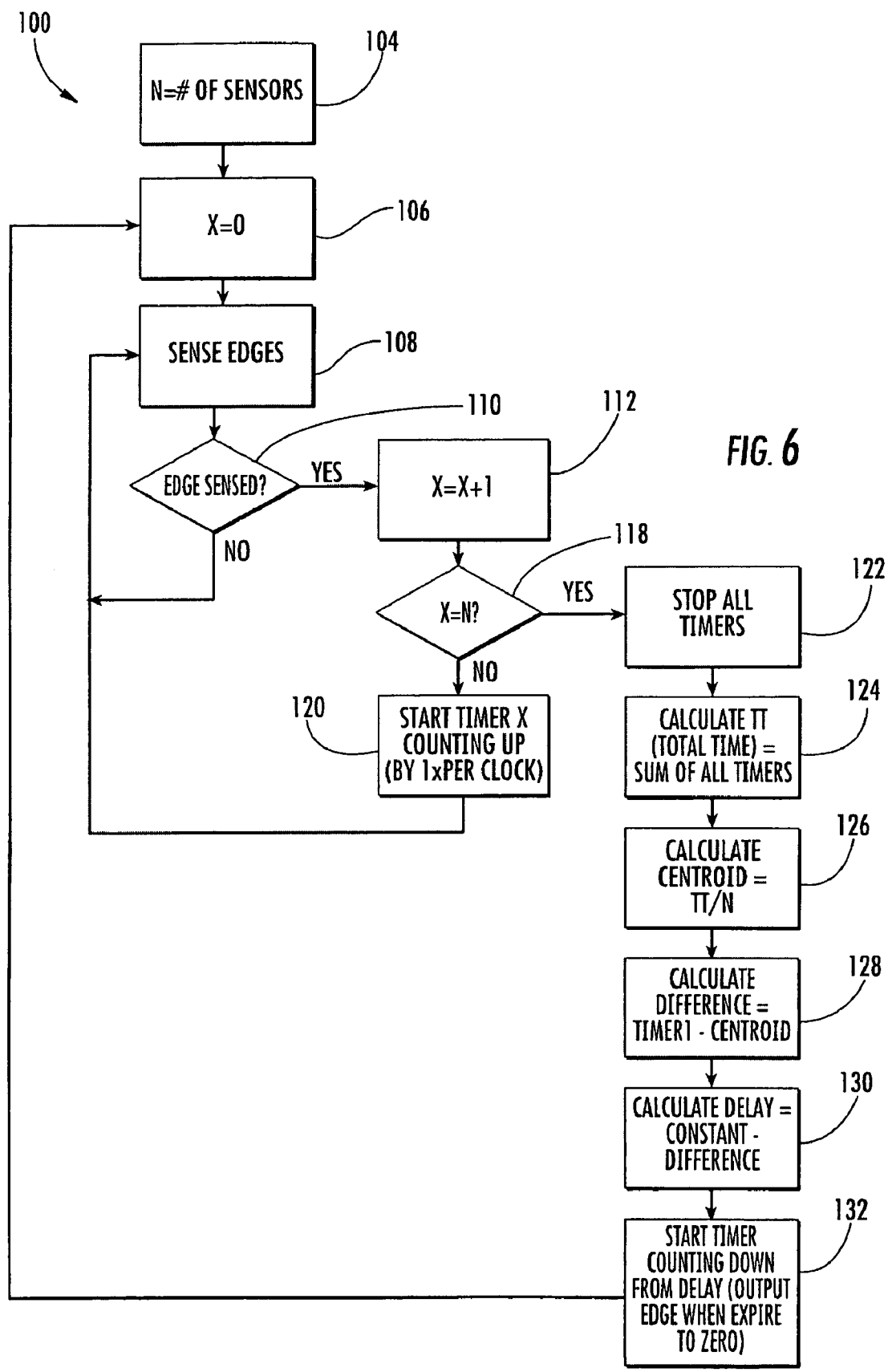
FIG. 6 is a flow diagram illustrating an encoding method according to an example embodiment.

FIG. 6 is a flow diagram illustrating one example of a method 100 by which output generator 26 (shown in FIG. 1) may determine a TWC and output an increment completion signal. As indicated by step 104, the value N is set to equal the number of sensors 24 located along track 22. As indicated by step 106, the value of the variable x, representing a count of edge signals received, is initially set to zero. As indicated by step 108, during rotation of the rotatable object and the associated encoder track 22, sensors 24 (shown in FIG. 1) sense the passing of edges 30 (shown in FIG. 1). As indicated by step 110, if no edge is sensed, sensors 24 continue to look for the passing of an edge 30. However, if an edge is sensed, the value of the variable x is increased by one as indicated by step 112. As indicated by step 118, if the value of x is not equal to N, indicating that the sensed edge was not the last edge of the cluster of edges, a timer associated with the particular edge x is started as indicated by step 120. Alternatively, if the value of x is equal to N, indicating that the sensed edge was the last or final edge of the cluster of edges, output generator 26 proceeds to determine the TWC and to output the increment completion signal. In particular, as indicated by step 122, output generator 26 stops each of timers 1 to N. As indicated by step 124, output generator 26 further sums the time of each of the timers 1 to N. As indicated by step 126, this total time TTY is divided by the number of timers N to determine a TWC. As indicated by step 128, output generator 26 calculates a difference between the total elapsed time since sensing of the first edge as represented by the value of the first Timer, Timer 1 and the calculated TWC. As indicated by step 130, output generator 26 then subtracts the difference from a predetermined time constant to calculate a Delay time for generating an increment completion signal or output edge. As indicated by step 132, a timer is set to the Delay value and is counted down. When the timer expires or reaches zero, output generator 26 outputs an increment completion signal. In another embodiment, output generator may alternatively start a timer and output the increment completion signal when the timer attains the Delay value.

Figure 7:
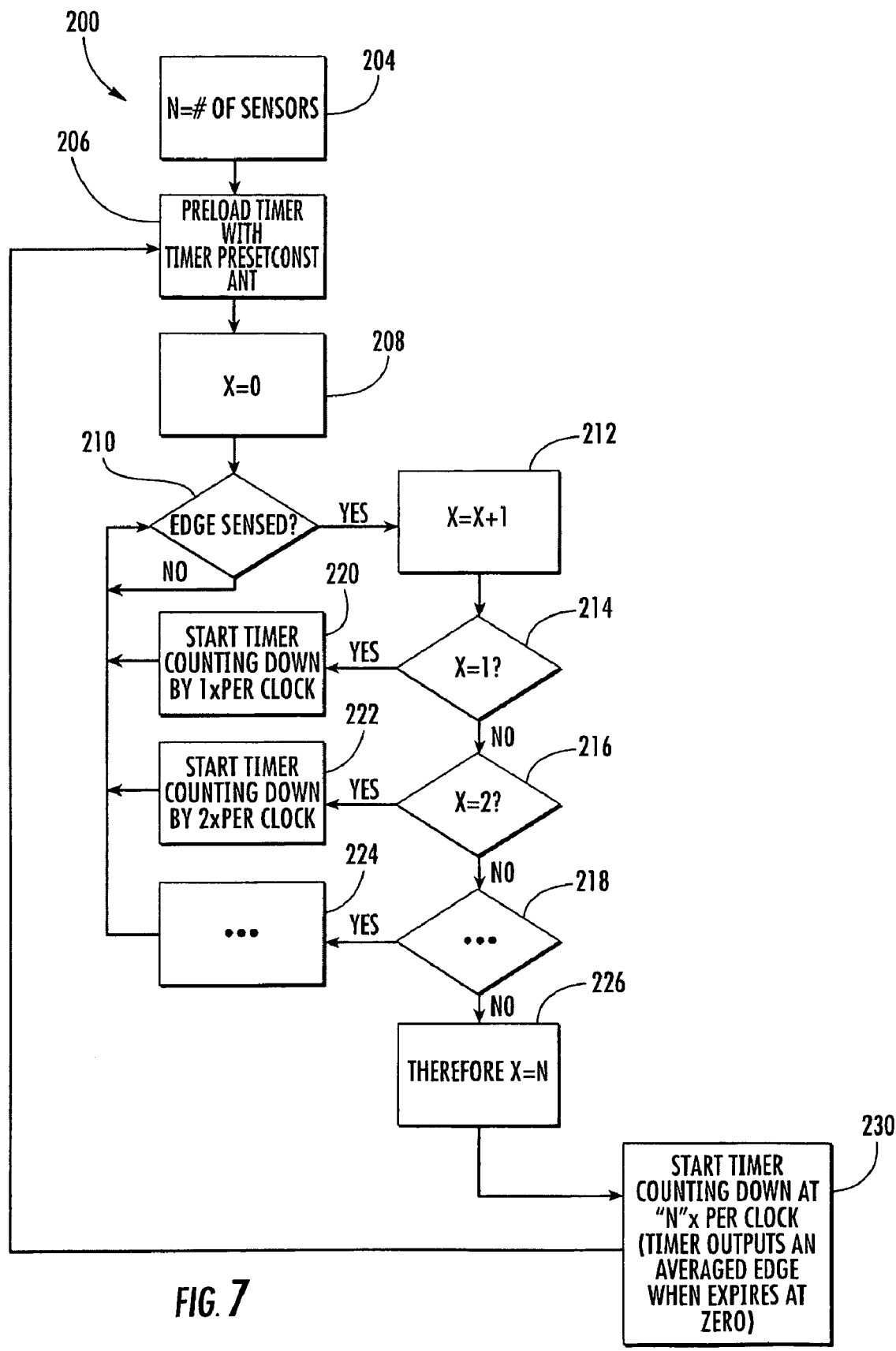
FIG. 7 is a flow diagram illustrating another encoding method according to an example embodiment.

FIG. 7 is a flow diagram of another method 200 may be used by output generator 26 to determine a TWC and to output an increment completion signal. Method 200 facilitates the calculation of a TWC and the output of the increment completion signal by output generator 26 without a processor and with ASIC components. As indicated by step 204, the variable N is set so as to be equal to the number of sensors 24 along track 22. As indicated by step 206, the timer is set or preloaded with an initial timer preset constant. The timer is a preloaded "down" counter that generates an increment completion signal upon expiring at zero and saturates at zero until preloaded again. As indicated by step 208, the variable x, representing a count of the edges that have been sensed, is initially set to a value of zero. As indicated by step 210, upon sensing of an edge 30 (the receipt of an edge signal by output generator 26), output generator 26 increases the value of x by one as indicated by step 212. As indicated by steps 214, 216 and 218, output generator 26 determines that value of x. As indicated by steps 220, 222 and 224, output generator 26 counts down the timer at a rate that is a multiple of x. For example, after the first edge is sensed, the timer will be counted down at a rate R, after the second edge is sensed, the timer will be counted down at a rate 2R and so on until the final edge is sensed. As indicated by step 226, if the variable x is equal to the variable N, indicating that the last edge (the Nth edge of an encoder system including N sensors) has been sensed. Thereafter, as indicated by step 230, the timer is counted down further at the rate NR until the timer reaches zero or is exhausted. For example, if encoder system includes three sensors, the timer will be counted down at a rate 3R until the timer value is equal to zero. As indicated by step 230, upon the timer counting down to zero, output generator 26 outputs the increment completion signal. Thereafter, method 200 is once again repeated by output generator 26, beginning at step 206, to once again identify when the object has rotated another increment.

Figure 8:
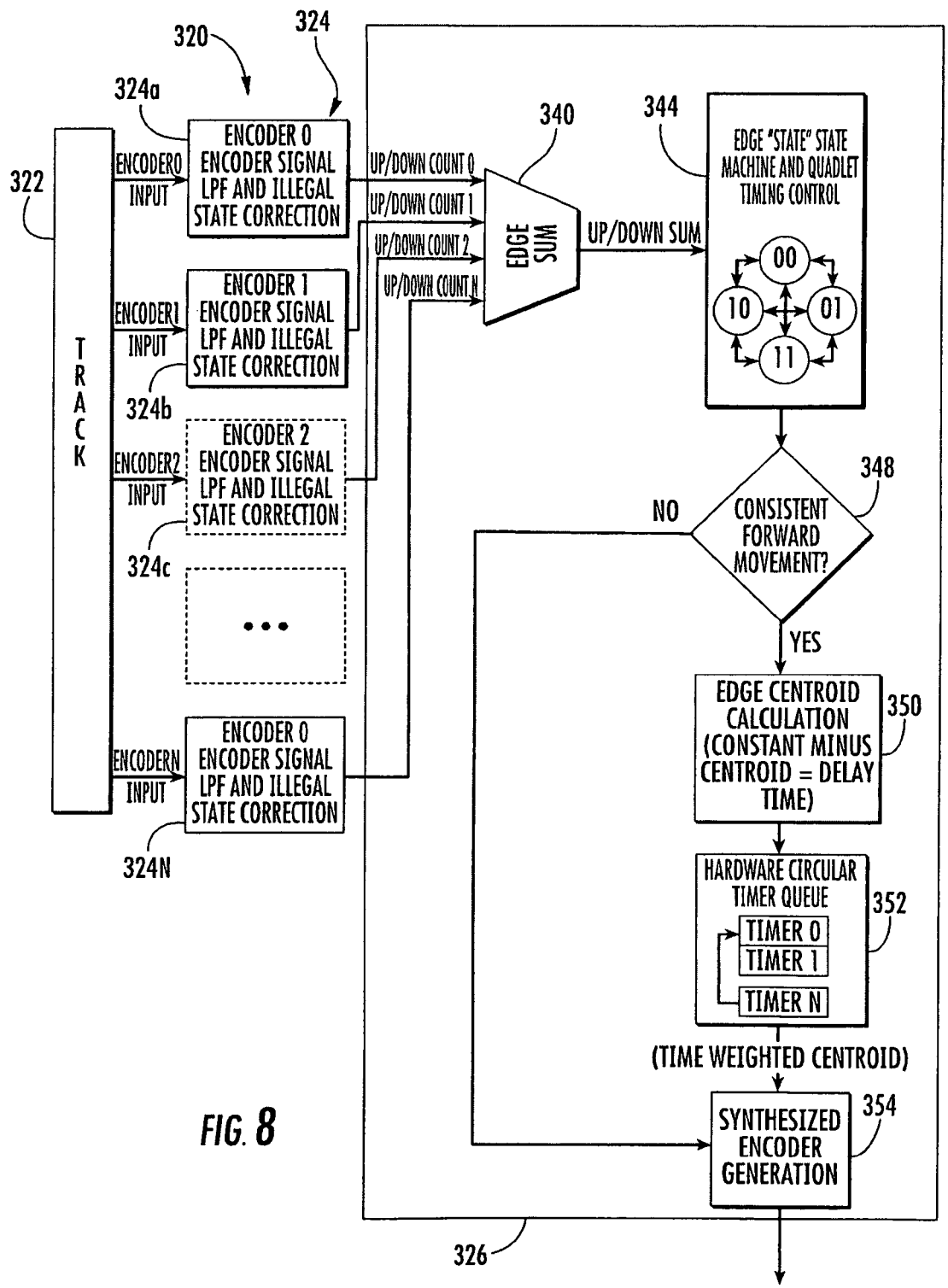
FIG. 8 is a schematic illustration of another embodiment of the encoder system of FIG. 1 according to an example embodiment.

FIG. 8 schematically illustrates encoder system 320, another embodiment of encoder system 20. Encoder system 320 includes encoder track 322, sensors 324, and output generator 326. Encoder track 322 is similar to encoder track 22 in that in encoder track 322 includes a multitude of increment marks having input edges equidistantly spaced from one another and configured to be sensed by sensors 324. In one embodiment, track 322 may be circular as shown in FIG. 1. In other embodiments, track 322 may be linear. In one embodiment, track 322 is coupled to a moving or movable object so as to move relative to sensors 324. In another embodiment, track 322 may be held stationary while sensors 324 are coupled to a movable object and move along track 322.

Sensors 324 comprise devices configured to sense the passing of the input edges of track 322 to relative movement between track 322 and sensors 324. In one embodiment, sensors 324 are additionally configured to detect a direction in which track 322 and sensors 324 are moving relative to one another. In the example illustrated, sensors 324 comprise quadrature encoder modules. Each quadrature encoder module includes a low pass filter (LPF) and illegal state correction.

As shown by FIG. 8, sensors 324 include at least two sensors 324A and 324B. As a result, system 320 may detect and correct for first order errors such as eccentricity. In particular embodiments, system 320 may include additional encoder modules or sensors 324C to 324N. Such additional sensors may enable system 320 to correct for higher order errors such as ovoidness.

Output generator 326 uses signals from sensors 324 to determine a TWC and output an increment completion signal. Output generator 326 includes one or more logic or electronic components configured to perform the steps shown in block 326. In particular, as indicated by block 340, output generator 326 receives signals from encoders 324 and sums the edges, such as the leading edges of such pulses or signals. As a result, the two or more streams of signals from the two or more sensors 324 are combined into a single stream such as shown by the sensor sum line in FIG. 3.

As indicated by block 344, output generator 326 further determines a direction in which track 322 and sensors 324 are moving relative to one another. As indicated by block 348, if track 322 and sensors 324 are not moving in a forward direction relative to one another or are not moving in the forward direction in a consistent or predictable manner with respect to one another over a predetermined period of time, increment completion signals are generated, as indicated by block 354 upon receipt of the last edge signal without determination of a TWC. Alternatively, as indicated by blocks 350-354, if track 322 and sensors 324 are moving relative to one another in a consistent or predictable forward manner, output generator 326 proceeds to determine a TWC and to output an increment completion signal using the TWC. In one embodiment, output generator 326 determines a time where centered and outputs an increment completion signal a predetermined constant offset from the TWC using method 200 shown described with respect to FIG. 7. As indicated by block 352, in the example illustrated in FIG. 8, output generator 326 includes multiple timers in a queue, wherein each timer is successively used for successive clusters of edge signals.

Figure 9:
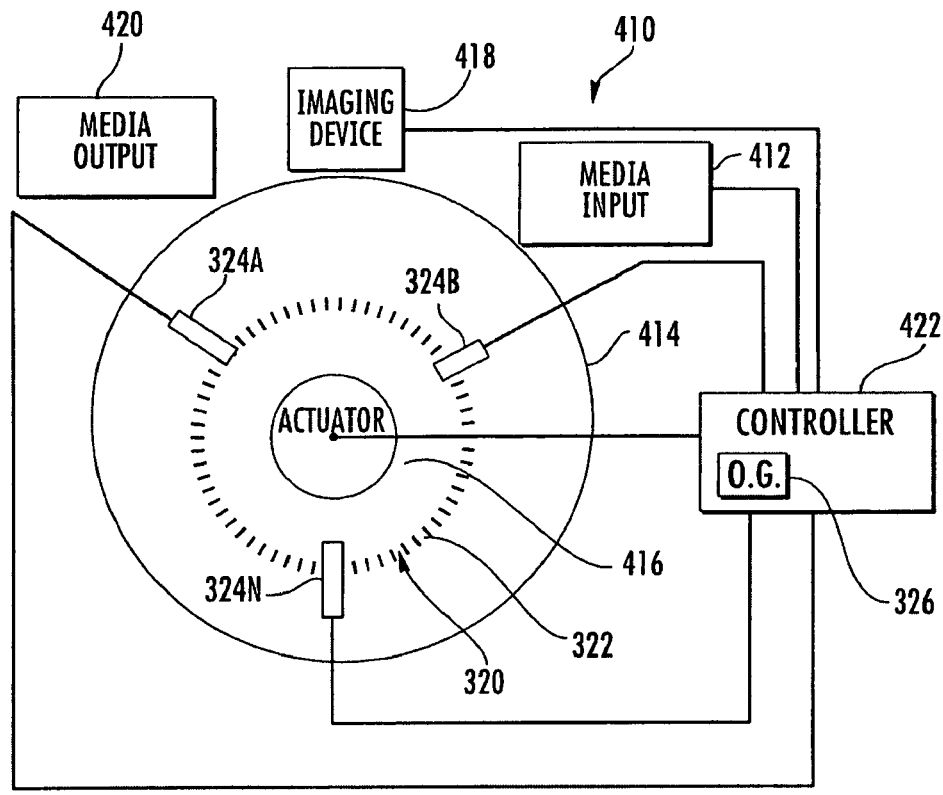
FIG. 9 is a schematic illustration of an imaging apparatus according to an example embodiment.

FIG. 9 schematically illustrates encoder system 320 employed as part of an imaging apparatus 410. In addition to encoder system 320, imaging apparatus 410 includes media input 412, media support 414, actuator 416, imaging device 418, media output 420 and controller 422. Media input 412 (schematically shown) may comprise a mechanism configured to supply and transfer sheets of media to support 414 of apparatus 410. In one embodiment, media input 108 may include a media storage volume, such as a tray, bin and the like, one or more pick devices (not shown) configured to pick a sheet of media from the storage volume and one or more media transfer mechanisms configured to transfer the media to support 414. Media input 108 may have a variety of sizes and configurations.

Media support 414 comprises one or more surfaces configured to support media to be printed upon opposite to imaging device 418. In particular embodiments, media support 414 is further configured to transport media from media input 412 to imaging device 418 and from imaging device 418 to media output 420. In the example illustrated, media support 414 comprises a cylinder or drum.

Actuator 416 comprise a device configured to move media support 414 relative to imaging device 418 so as to transport media relative to imaging device 418. In the example illustrated, actuator 416 comprises a rotary actuator, such as a motor, coupled to media support 414 which comprises a drum.

Imaging device 418 (schematically shown) comprises a mechanism or device configured to print or otherwise form an image upon sheets of media held by support 414. In one embodiment, imaging device 418 may be configured to eject fluid ink onto sheets of media held by support 414. In one embodiment, imaging device 418 may include one or more print heads carried by a carriage that are configured to be scanned across sheets of media held by support 414 in directions generally along a rotational axis of support 414. In other embodiments, imaging device 418 may include print heads which substantially extend across a width or a dimension of sheets of media held by support 414 such as with a page-array printer. In still other embodiments, imaging device 418 may comprise other printing devices configured to deposit ink, toner or other printing material upon sheets of media held by support 414 in other fashions.

Media output 420 comprises a mechanism or device configured to transport sheets of media to one or more locations for further interaction or for output to a user of printing apparatus 410. For example, in one embodiment, media output 420 may be configured to transport such ejection sheets of media to a duplexer and back to media input 412 for two-sided printing. In still another embodiment, media output 420 may be configured to transport such ejected sheets to an output tray or bin for receipt by a user of imaging apparatus 410.

Controller 422 comprises one or more processing units configured to generate control signals directing the operation of rotary actuator 416, media input 412, imaging device 418 and media output 420. As shown by FIG. 9, controller 422 incorporates output generator 326. For purposes of this disclosure, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. Controller 422 is not limited to any specific combination of hardware circuitry and software, nor to any particular source for the instructions executed by the processing unit.

In operation, controller 422 generates control signals directing actuator 416 to rotatably drive support 414. Controller for 22 further generate control signals directing media input 412 to supply print media to support 414. As a result, support 414 transports the supplied sheet of media to imaging device 418 which deposits printing material upon the sheet. In one embodiment, imaging device 418 deposits fluid droplets onto the sheet. In another embodiment, imaging device 418 electrostatically deposits toner or other printing material upon the sheet carried by media support 414. Once printing has been completed, the sheet is discharged to media output 420.

Imaging device 418 deposits printing material upon the sheet in response to control signals from controller 422. Controller 422 generates such control signals based upon a determined position of the sheet to be printed upon relative to imaging device 418. This position is determined by controller 422 using increment completion signals received from output generator 326 and encoder system 320. Because encoder system 320 provides for more accurate output of increment completion signals, a more accurate determination of the position of media support 414 and the sheet of media held by media support 414 may be achieved. This may result in more accurate deposition of printing material upon the sheet for enhanced image quality.

Figure 10:
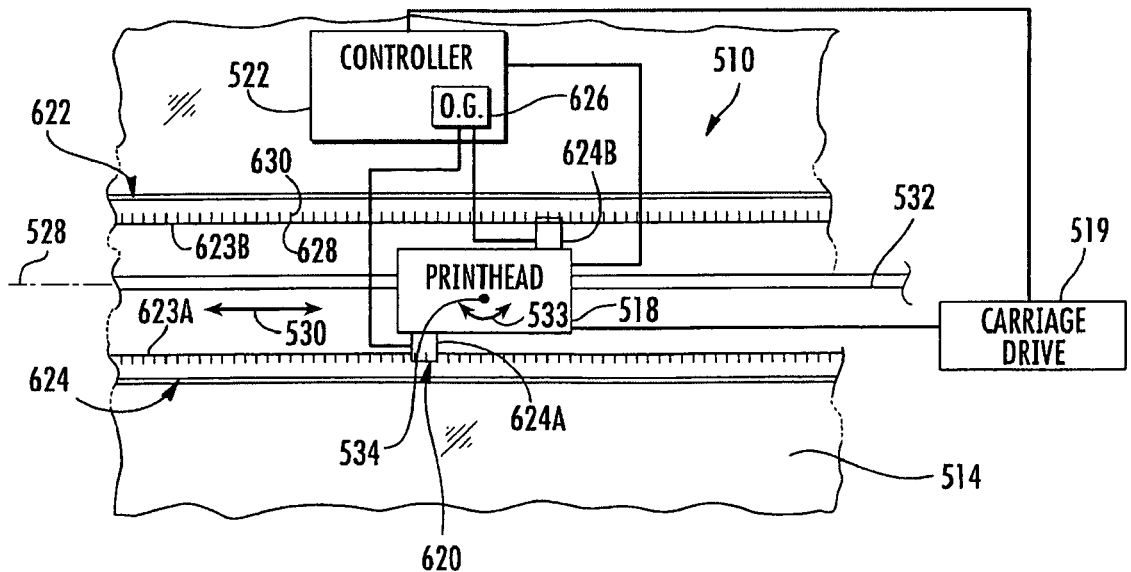
FIG. 10 is a schematic illustration of another embodiment of an imaging apparatus according to an example embodiment.

FIG. 10 is a top plan view schematically illustrating imaging apparatus 510 incorporating encoder system 620, another embodiment of encoder system 320. Apparatus 510 includes media support 514, print head 518, carriage drive 519 and controller 522. Media support 514 comprises a surface extending opposite to print head 518 configured to support media during printing by print head 518. In one embodiment, media support 514 may comprise a platen, wherein media is moved by one or more belts, rollers or other structures in engagement with the media. In another embodiment, support 514 may itself comprise a roller or a belt.

Printhead 518 comprise a device configured to scan or move along an axis 528 across a width of the media supported by support 514 is indicated by arrows 530. In the embodiment illustrated, print head 518 is movably supported and guided by one or more carriage rods 532 which extend along or parallel to axis 528. Carriage drive 519 comprises a device or mechanism coupled to print head 518 so as to move print head 518 along axis 528 as guided by rod 532. In other embodiments, print head 518 may be moved along axis 528 in other fashions.

Controller 522 comprises one or more processing units configured to generate control signals for directing operation of print head 518, carriage drive 519 and any mechanisms (not shown) for moving media relative to print head 518. As shown by FIG. 10, controller 522 incorporates output generator 626 of encoder system 624. Controller 522 uses increment completion signals output by output generator 626 to generate control signals for directing the deposition of printing material upon media by printhead 518.

Encoder system 624 is similar to encoder system 320 shown in FIG. 9 except that encoder system 624 includes encoder track 622 and sensors 624A and 624B (collectively referred to as sensors 624). Encoder track 622 includes track portions 623A and 623B (collectively referred to as track portions 623). Track portions 623 each comprise elongate linear structures extending parallel to or along axis 528 on opposite sides of printhead 518. Track portions 623 each include a multitude of marks 628 having edges 630 configured to be sensed by sensors 624.

Sensors 624 comprised devices configured to sense the passing or relative movement of edges 630. Sensors 624 are attached to opposite sides of printhead 518 at opposite ends of printhead 518 along axis 528. In one embodiment, sensors 624 comprise quadrature encoders.

Output generator 626 is incorporated as part of controller 522. In other embodiments, output generator 626 may be independent of controller 522 while supplying increment completion signals to controller 522. In one embodiment, output generator 626 operates according to method 200 shown and described with respect to FIG. 7. In other embodiments, output generator 626 may operate using other methods, wherein the increment completion signal is output a constant time offset following a determined TWC of edge signals received from sensors 624.

As indicated by arrows 533, during movement of printhead 518 along axis 528, printhead 518 may rotate or pivot about axis 534. This may cause edge signals from one of sensors 624 to occur prior to the ideal time (the time in which movement of printhead 518 a distance equal to an increment is actually completed) and edge signals from the other of sensors 624 to occur after the ideal time. Because encoder system 620 determines a TWC of the received edge signals and outputs the increment completion signal a predetermined constant offset from the TWC, encoder system 620 may more accurately indicate the positioning of printhead 518 along axis 528. As a result, printing performance may be enhanced.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. A method comprising:
    sensing a plurality of edges of a plurality of marks of a track during movement of the track a distance of one increment, the plurality of edges including a first edge, a second edge and a third edge, wherein the second edge is sensed after sensing of the first edge and wherein the third edge is sensed after sensing of the second edge;
    determining the first time lapse between the sensing of the first edge and the sensing of the third edge;
    determining a second time lapse between the sensing of the second edge and the sensing of the third edge;
    determining a time weighted centroid (TWC) of the sensed edges by applying a first multiplier to the first time lapse and a second multiplier different than the first multiplier to the second time lapse; and
    outputting a signal based on the TWC.

2. The method of claim 1, wherein the signal is output at a predetermined constant time offset from the TWC.

3. The method of claim 1, wherein the track is circular.

4. The method of claim 1, wherein the edges include at least three sensed edges from at least three sensors.

5. The method of claim 1, wherein the edges include at least 4 sensed edges.

6. The method of claim 1, wherein determination of the TWC and outputting the signal is achieved using a single timer.

7. The method of claim 1 further comprising ejecting a fluid droplet from a printhead based upon the increment completion signal.

8. The method of claim 1, wherein determining a TWC and outputting an increment completion signal based upon the TWC further comprises:
    upon sensing a first edge, counting down from a constant at a rate R until sensing a successive edge x, where x=2 to n and where n=the number of sensors along the encoder track;
    upon sensing each successively sensed edge x, counting down from a remaining value of the constant at a rate xR until a next successive edge is sensed;
    upon sensing an nth edge, counting down from the remaining value of the constant at a rate nR until exhaustion of the constant; and outputting the increment completion signal upon exhaustion of the constant.

9. An encoder system comprising:
an encoder track having leading edges equidistantly spaced by an increment;
sensors along the track configured to sense passing of the edges during movement of the track by an increment; and
an output generator configured to determine a time weighted centroid (TWC) of sensed edges of the encoder track during movement of the track a distance of one track increment and to output a signal based on the TWC, wherein the output generator is configured to: (1) count down from a constant at a rate y upon sensing a first edge and until sensing a successive edge x, where $x=2$ and where $n=$ the number of sensors along the encoder track; (2) to count down from a remaining value of the constant at a rate xy until a next successive edge is sensed and (3) to output the increment completion signal upon exhaustion of the constant.

10. The encoder system of claim 9, wherein the track is circular.

11. The encoder system of claim 9, wherein the sensors are equidistantly positioned about the track.

12. The encoder system of claim 9, wherein the sensors include at least three sensors.

13. The encoder system of claim 9, wherein the sensors include at least four sensors.

14. The encoder system of claim 9, wherein the track includes the first linear portion and a second linear portion substantially parallel to the first linear portion.

15. The encoder system of claim 9, wherein the sensors comprise quadrature encoder sensors.

16. An imaging apparatus comprising:
an image forming device;
a media support, wherein one of the device and the support is configured to move relative to the other;
an encoder track having marks providing encoder edges;
sensors configured to sense passing of the edges, wherein one of the track and the sensors is configured to move with said one of the device and the support; and
an output generator configured to determine a time weighted centered (TWC) of sensed encoder edges of a plurality of the marks of the encoder track during movement of the track one track increment and to output an increment completion signal based on the TWC, wherein the TWC is based upon application of different multipliers to different elapsed times between sensed passing of the encoder edges.

17. A method comprising:
determining a time weighted centered (TWC) of sensed edges of a track during movement of the track the distance of one track increment; and
outputting a signal based on the TWC, wherein determining a TWC and outputting an increment completion signal based upon the TWC further comprises:
upon sensing a first edge, counting down from a constant at a rate R until sensing a successive edge x, where $x=2$ to n and where $n=$ the number of sensors along the encoder track;
upon sensing each successively sensed edge x, counting down from a remaining value of the constant at a rate xR until a next successive edge is sensed;
upon sensing an nth edge, counting down from the remaining value of the constant at a rate nR until exhaustion of the constant; and
outputting the increment completion signal upon exhaustion of the constant.

* * * * *

UNITED STATES PATENT AND TRADEMARK OFFICE
CERTIFICATE OF CORRECTION

PATENT NO. : 7,463,168 B2 Page 1 of 1
APPLICATION NO. : 11/490577
DATED : December 9, 2008
INVENTOR(S) : David A. Rehmann et al.

It is certified that error appears in the above-identified patent and that said Letters Patent is hereby corrected as shown below:

In column 2, line 6, delete "centered" and insert -- centroid --, therefor.

In column 2, line 10, delete "centered" and insert -- centroid --, therefor.

In column 3, line 3, delete "ooziness" and insert -- ovoidness --, therefor.

In column 4, line 6, delete "centered" and insert -- centroid --, therefor.

In column 5, line 66, delete "TTY" and insert -- TT --, therefor.

In column 7, line 37, delete "centered" and insert -- centroid --, therefor.

In column 10, line 46, in Claim 4, before "sensors" insert -- spaced --.

In column 12, line 8, in Claim 16, delete "centered" and insert -- centroid --, therefor.

In column 12, line 16, in Claim 17, delete "centered" and insert -- centroid --, therefor.

Signed and Sealed this

Fourth Day of August, 2009

JOHN DOLL
*Acting Director of the United States Patent and Trademark Office*